United States Patent Office 3,666,508
Patented May 30, 1972

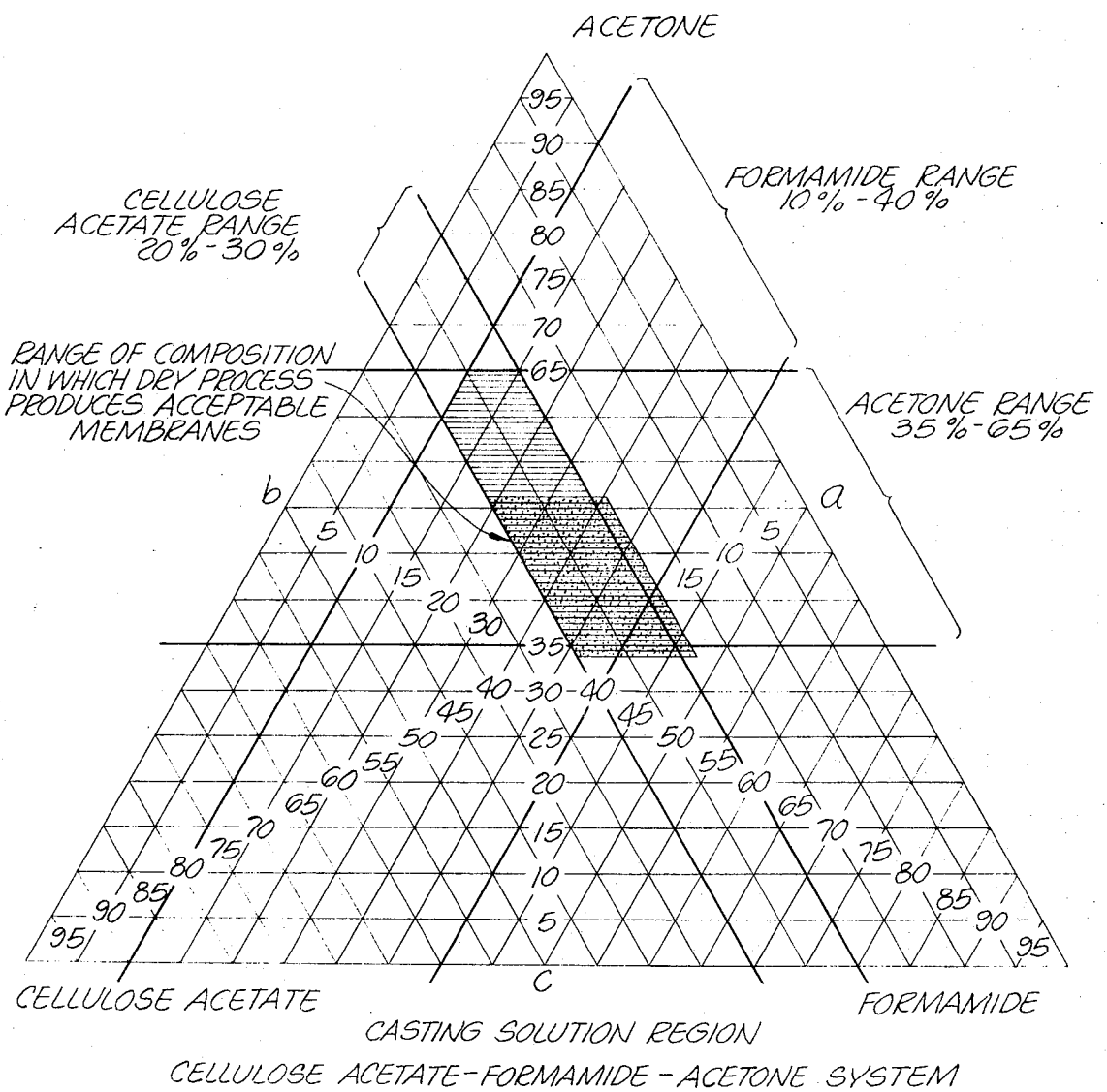

---

3,666,508
HIGH FLUX SEMIPERMEABLE CELLULOSIC DERIVATIVE MEMBRANES WITH DRY HANDLING CAPABILITIES AND THEIR METHOD OF PREPARATION
Mary Ann Justice, Los Angeles, Calif., and Joseph W. McCutchan, University Park, Md., assignors to The Regents of the University of California
Filed May 22, 1968, Ser. No. 731,094
Int. Cl. B29d 27/04; C08b 27/42, 29/10
U.S. Cl. 106—183
12 Claims

ABSTRACT OF THE DISCLOSURE

The present invention is directed to dry semipermeable membranes which can advantageously be dry-stored and used for the selective separation of various components of a solution such as salt water. The membranes are prepared by casting a solution of a cellulosic derivatives having units represented by the formula

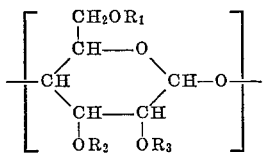

wherein $R_1$, $R_2$ and $R_3$ are selected from the group consisting of $R_4$ and $CR_5O$, wherein hydrogen $R_4$ is an alkyl containing from 1 to 8 carbon atoms and $R_5$ is an alkyl containing from 1 to 7 carbon atoms, and wherein no more than two of $R_1$, $R_2$, and $R_3$ can be H, to form a membrane. The membrane is then immersed in an aqueous medium for a time sufficient for the formation of a membrane possessing a tough outer skin on the side exposed to air during casting. The membrane is then dried at room temperature. A preferable cellulosic solution is composed of cellulose acetate dissolved in acetone containing formamide as an additive.

BACKGROUND OF THE INVENTION and DESCRIPTION OF THE PRIOR ART

In recent years, much research and development has taken place to uncover different methods and materials for the obtention of fresh or potable water from such sources as sea water, brackish subsoil water, or river water of 500 p.p.m. or more of dissolved solids. In fact the Federal Government has embarked on an extensive research program to solve the problem of recovering fresh water economically from saline water, such as sea water or brackish subsoil water bodies, polluted streams, or sewage reclamation. The programs have evolved many methods for recovering fresh water from saline waters. Most methods of fresh water recovery from saline solutions involve the transfer of heat under thermodynamically irreversible conditions, so that the process as a whole has limited efficiency. In addition, in order to attain the high rate of heat flow necessarily required, the saline solutions are normally handled at relatively high temperatures which results in severe corrosion and scale problems. Also, the heat transfer approach normally requires a large number of stages in series to increase heat economy so that a large amount of equipment and much operational maintenance is required.

U.S. Pats. Nos. 3,133,132 and 3,283,042 and copending U.S. application Ser. No. 354,775, now Pat. No. 3,344,214 which are all directed to this particular area satisfactorily describe processes and materials which of late have become very significant in the field. The processes described therein utilize a simple method which can be made to approach thermodynamic reversibility to produce in a simple step potable water, i.e., less than 500 p.p.m. dissolved solids from a sea water brine containing solids in considerably greater concentration than is found in sea water. The process generally comprises forcing salt water against a semipermeable membrane, which has been produced in the particular manners described in the patents and application mentioned above, under a hydraulic pressure somewhat greater than the osmotic pressure of the salt solutions (approximately 350 p.s.i. for a fresh water-sea water interface), a reverse osmosis appears to occur and fresh water flows through the membrane from the saline water side.

The membranes which have been utilized successfully in the described processes must fulfill certain prerequisites and accordingly their structures are of a critical nature. For example, the membranes must not only be capable of permitting the transfer of the water while effectively reducing the concentration of the undesired solutes or solids to any desired value, but structurally the membranes must be capable of withstanding hydrostatic pressure sufficient to permit the reverse osmosis to be effectuated.

As will be appreciated, stretching of the membrane is acceptable only within specific tolerances; otherwise, the efficiency of the system is at stake. In addition, it is desirable to have a membrane which can be fabricated in geometries that may or may not require a supporting member. This flexibility in design will of course affect the flow rate and the ultimate economics of the system.

The membranes described in the prior art and in the co-pending application have met the necessary prerequisites and perform the necessary functions quite adequately. However, the membranes possess one peculiarity which, as will be appreciated, causes some problem with respect to use, storage, and in general as a staple article of commerce. The membranes produced by the methods described should be maintained in a wet state or in a humidity chamber. If the membranes as produced by the known processes are allowed to dry, they become largely unusable for the purpose contemplated. This peculiarity of courses gives rise to various handling and storage problems not to mention the problems that are involved in the sale and shipment of these membranes.

Accordingly, it is apparent that the field is in great need of a membrane which would not only perform satisfactorily in the process described, but one which would obviate the problems which are peculiar to the membranes which are described in the prior art and in use at this time.

In pursuing this objective applicants discovered that if a membrane is made under a specific set of conditions and utilizing specific amounts of particular materials, a membrane could be produced which would not only be effective in reverse osmosis processes, but a membrane which could be handled, stored, transported, used, dried and reused without deleteriously affecting the membrane or the efficiency of the reverse osmotic system. The dry membrane also simplifies fabrication in that heating as a separate stage is eliminated. Also, the length of time that the membrane must remain immersed is shortened considerably.

GENERAL DESCRIPTION OF THE INVENTION

The membranes of the present invention are prepared generally by casting a solution of a cellulosic derivative selected from the class consisting of cellulosic ethers and cellulosic esters having units of the formula

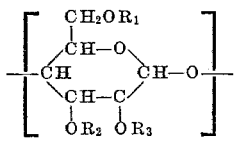

wherein $R_1$, $R_2$ and $R_3$ are selected from the group consisting of hydrogen $R_4$ and $CR_5O$, wherein $R_4$ is an alkyl group containing 1 to 8 carbon atoms and $R_5$ is an alkyl group containing from 1 to 7 carbon atoms, and wherein no more than two of $R_1$, $R_2$, and $R_3$ can be H, to form a membrane; immersing the cast membrane in an aqueous medium for a time sufficient for the formation of a membrane possessing a dense outer skin on at least one surface of said membrane; removing the thus formed membrane from said aqueous medium; and drying said membrane at ambient temperatures. The substituents $R_1$, $R_2$ and $R_3$ of the formula may also be defined as consisting of hydrogen, alkyl of 1 to 8 carbon atoms or alkanoyl of 1 to 8 carbon atoms, provided, however, that no more than two of the substituents $R_1$, $R_2$ and $R_3$ may be hydrogen.

Although all the cellulosic derivatives having units as exemplified by the above formula are usable, particular success has been obtained using cellulose acetate. The relative proportions of the cellulosic derivative in the casting solution may range from 18 to 30% by weight while the remaining weight percentage is constituted by solvents such as dimethylsulfoxide, dimethylformamide, acetic acid, acetaldoxime and diacetone alcohol or a solvent additive mixture composed of acetone and formamide or a mixture of acetone and glyoxal. A cellulosic solution composed of from about 18 to about 30% by weight of cellulose acetate, from about 33% to about 52% by weight acetone and from about 18% to 48% of formamide has yielded dry membranes which upon use in the reverse osmotic systems have exhibited an excellent balance between the yield of treated water and the desalination or separation effected thereby.

It will be recognized by those skilled in the art that all of the solvents named in the preceding paragraph are water soluble, and indeed are designated as such in standard reference texts such as the Merck Index, 7th Edition, 1960 and 8th Edition, 1968; and the Handbook of Chemistry and Physics, Cleveland, 47th Edition, 1966.

In some instances it is advantageous to add to the cellulosic solutions certain organic additives such as urea or long-chain alkyl quaternary ammonium salts, as more fully described hereinbelow.

Casting technique

The casting technique is generally the same as that employed in producing the wet membranes. The membranes may be cast on an 8 x 8 inch glass plate which has side runners composed of 0.01 inch thick steel strip. The cellulosic solution is spread using a doctor blade which is drawn across the plate resting on the side runners. The cast membrane is then approximately 0.01 inch thick. After immersion, which will be described infra, wherein the solvent is removed from the membrane, the membrane thickness is reduced by about one-third to one-half, and thus in this example to about 0.005 to 0.007 inch. During immersion, the membrane may shrink up to 2% laterally. Further lateral shrinkage occurs during drying. By using steel strips of thickness 0.005 inch to 0.02 inch, correspondingly thinner or thicker films may be produced.

Cast time

The casting time measured includes the spreading time and the time required to transfer the membrane plate assembly to the immersion aqueous medium which in most cases is water. The range of casting times which have been found to yield particularly good membranes which can be dried range from about two seconds to about one minute, and in the case of a .05 minute casting, there is virtually no evaporation of the solvent from the body of the membrane; while in a casting time of about one minute, some but not a large amount of evaporation of the solvent occurs. The best membranes produced have been cast in times ranging from about .05 minute to 0.10 minute. The cast times will of course depend upon the casting solution and will depend upon the ultimate purpose for which the membrane is to be used. For example, in many instances it may be desirable to separate various salts from a solution where the demands upon the volume of solution treated and the requirements as to the amount of salt removed are not as stringent as in the preparation of potable water from salt water or under-soil brackish water. Such applications include the artificial kidney application where salt rejection is not of the greatest significance.

Immersion medium and temperature

The immersion medium is an aqueous medium and in most instances simply water. The temperature of the aqueous medium should range from about 20° to about 90° C. with the best results being obtained at temperatures of between about 30° and 80° C. As will be appreciated the best immersion temperatures are composition dependent and with these specific recommendations, the worker in the art will be able to determine the best conditions necessary to obtain a membrane which will perform his desired purpose. The immersion temperature and time should be such that a tough outer skin is formed on the surfaces of the membrane. This skin should be as uniform as possible on both surfaces, although it is believed that the molecular structure of the membrane is significantly different on the side toward the plate on which it is cast from the side first exposed to the aqueous medium.

Immersion technique

The immersion technique is an important variable and one which should be controlled as closely as possible. The immersion technique which has been determined as yielding the most consistent membranes requires that the plate bearing the cast membrane be dropped into a pan of water with the plane of the membrane-plate assembly being parallel to the surface plane of the water. This technique results in the formation of eddy-like motions of the water which pass over the cast membrane. The water may then be gently agitated periodically. This method produces membranes which are superior in performance than those produced by other immersion techniques such as dropping the assembly either vertically or at an angle into swirling or still water.

Immersion time

The length of time the newly-cast membrane must remain in the immersion water depends again primarily upon the composition and the desired function of the ultimate membrane and to a lesser degree on the immersion medium temperature and casting time. Generally the range is from about 1 to 30 minutes. The best membranes have been fabricated using a 2 to 5 minute immersion time. Although good membranes (9.5 gal./ft.$^2$ day with a desalination ratio (DR) of 50 or better) can be produced using longer immersion times (up to 30 minutes), those giving the best performance are those produced by shorter immersion times which may be due simply to the fact that better control of immersion water agitation can be maintained with the shorter immersion times.

Drying

After removal of the membrane from the immersion medium, the membrane is blotted and allowed to dry at ambient temperature for a suitable amount of time to effect substantial drying of the membrane. In most cases the drying time required was a minimum of 10 hours.

Membranes produced by the above described method have been stored dry for several weeks and after that time utilized in a reverse osmotic system. The membranes performed exceptionally well and in order to determine the effect of redrying and storage of the film, the membranes tested were redried, stored and again tested.

The performances of these membranes indicated that they retained essentially their original properties. Generally the flux tends to be lower and the desalinization ratio higher for a membrane which has been used, dried, stored and reused. For example one membrane sample which originally gave a flux of 17.6 gal./ft.$^2$ day with a desalinization ratio (DR) of 60, later after redrying and storage for two months gave a flux of 12.3 gal./ft.$^2$ day with a DR of 78.

Testing

All tests were made on flat sample sheets of membranes having an effective area of two square inches (tubes cast using the above described process were also tested by cutting out flat samples). The samples were run under 600 p.s.i.g. pressure with a brine circulation rate of 800 to 1000 cc./min. The brine was a 0.5% solution of NaCl in water. The temperature of the brine solutions was approximately 90° F.

Additional tests

The membranes were also tested under higher pressure (1400 p.s.i.g) with a 5% NaCl brine for possible sea water application. The results were impressive (5.9 gal./ft.$^2$ day with a DR of 92), which clearly indicates that sea water can be made potable in just one pass through the membranes produced by the present process. The flux was also acceptable under the specified operating conditions.

As is evident from the foregoing description and the tables which follow, the cellulose acetate-acetone-formamide casting solutions produced the most effective membranes. Alternatively, other additives can be used in place of formamide, while still retaining some of the advantages of the invention. A 50% solution of soya-trimethyl ammonium chloride (soya referring to the alkyl radicals derived from soya fatty acids) in isopropanol with a 1% NaCl content; or alternatively, urea could be used quite effectively and the membranes produced therefrom performed satisfactorily. In addition, other quaternary salts but of smaller molecular size were found to be quite useful as additives. Diacetone alcohol was found to be useful as a solvent-additive, i.e., the reagent acts as both a solvent and an additive, as was acetaldoxime. Performance of the membranes produced therefrom are listed in the following table.

Two of the most notable additives were glyoxal and dimethylformamide. Membranes made from a cellulose acetate, glyoxal, acetone and water casting solution gave high flux (up to 60 gal./ft.$^2$ day) and adequate salt rejection (DR 6.7) while the membrane produced from dimethylformamide casting solutions gave a high flux of 92 gal./ft.$^2$ day with somewhat less salt rejection. The high flux membranes find special application other than the conversion of saline water, for example, in the artificial kidney application where salt rejection is not as important.

Description of the drawing

The drawing is a graphic illustration of the various cellulose acetate, acetone, formamide casting solutions studied. The drawing as such is self-explanatory and is directed to the various formulations referred to in Table I.

Having thus described the general aspects of the invention, the invention will be discussed in greater detail in the following specific embodiments. These embodiments are included for illustration purposes only and are not to be considered as limitative of the invention as a whole.

EXAMPLE I

Various casting solutions composed of cellulose acetate, acetone and formamide were made, cast, immersed and dried (10 hours at ambient temperatures) and the particulars of these formulations, their tretament and the results derived from the testing of the membranes obtained are set forth in the following Table I and illustrated in the drawing. In all solutions studied in this example, the ratio of the cellulose acetate to acetone was held constant (0.555) and the amount of additive, i.e., formamide was varied from 24.3% to 47.7% (all percentages are by weight). By adjusting various variables as will be clear from Table 1, membranes with acceptable physical properties and performances were made using all of the compositions.

TABLE 1.—PERFORMANCE CHARACTERISTICS OF DRY CELLULOSE ACETATE-ACETONE-FORMAMIDE MEMBRANES

| Casting composition (wt. percent) | Sample Number | Product | | Fabrication variables | | |
|---|---|---|---|---|---|---|
| | | Flux, gal./ft.$^2$ day | Desalination ratio [1] | Temp., °C. of immersion water | Immersion time, period of time membrane left in water, min. | Cast time time from, start of cast to immersion, min. |
| Composition I: Cellulose acetate (27.0); Acetone (48.7); Formamide (24.3). | I (a) | 4.9 | 113.7 | 56 | 4 | .10 |
| | I (b) | 7.3 | 97.0 | 56 | 4 | .05 |
| | I (c) | 4.0 | 49.2 | 64 | 4 | .10 |
| Composition II: Cellulose acetate (25); Acetone (45); Formamide (30). | II (a) | 9.3 | 131.0 | 64 | 4 | .10 |
| | II (b) | 11.2 | 82.5 | 64 | 4 | .10 |
| Composition III: Cellulose acetate (24.1); Acetone (43.4); Formamide (32.5). | III (a) | 5.9 | 92.0 | 68 | 3 | .10 |
| | III (b) | 8.4 | 65.0 | 64 | 5 | .10 |
| Composition IV: Cellulose acetate (23.2); Acetone (41.8); Formamide (34.9). | IV (a) | 4.2 | 114.0 | 72 | 2 | .10 |
| | IV(b) | 8.7 | 86.0 | 68 | 2 | .10 |
| | IV(c) | 14.6 | 78.6 | 64 | 4 | .10 |
| | IV(d) | 9.5 | 48.0 | 56 | 5 | .05 |
| | IV(e) | 19.0 | 58.0 | 64 | 4 | .05 |
| Composition V: Cellulose acetate (21.7); Acetone (39.2); Formamide (39.2). | V(a) | 7.3 | 80.0 | 72 | 2 | .10 |
| | V(b) | 9.8 | 64.0 | 72 | 2 | .05 |
| | V(c) | 16.8 | 28.0 | 68 | 2 | .05 |
| | V(d) | 11.2 | 41.0 | 60 | 3 | .10 |
| | V(e) | 12.1 | 34.0 | 56 | 4 | .10 |
| Composition VI: Cellulose acetate (20.8); Acetone (37.5); Formamide (41.6). | VI(a) | 7.3 | 60.4 | 80 | 2 | .10 |
| | VI(b) | 13.2 | 45.2 | 72 | 3 | .10 |
| | VI(c) | 20.2 | 25.0 | 68 | 3 | .10 |
| | VI(d) | 19.6 | 36.0 | 64 | 4 | .10 |
| Composition VII: Cellulose acetate (20.1); Acetone (36.2); Formamide (43.7). | VII(a) | 14.3 | 39.0 | 71 | 3 | .05 |
| | VII(b) | 17.2 | 25.2 | 68 | 3 | .10 |
| Composition VIII: Cellulose acetate (18.7); Acetone (33.7); Formamide (47.7). | VIII(a) | 16.0 | 6.6 | 80 | 2 | .05 |
| | VIII(b) | 33.14 | 2.2 | 68 | 3 | .10 |
| | VIII(c) | 10.0 | 16.0 | 64 | 4 | 1.00 |

[1] Percent salt in brine/percent salt in product.

TABLE 2.—VARIOUS IMMERSION TEMPERATURES

| Casting composition | Sample number | Product | | Fabrication variable | | |
|---|---|---|---|---|---|---|
| | | Flux, gal./ft.² day | Desalination ratio [1] | Temp., °C. of immersion water | Immersion time, period of time membrane left in water, min. | Cast time, time from start of cast to immersion, min. |
| Composition II | IIA | (²) | | 29 | 4 | .10 |
| | IIB | (³) | | 31 | 4 | .13 |
| | IIC | 0.8 | 10 | 40 | 4 | .05 |
| | IID | 2.6 | 12 | 40 | 4 | .10 |
| | IIE | 7.6 | 12.4 | 50 | 4 | .05 |
| | IIF | 6.7 | 12.4 | 50 | 4 | .10 |
| | IIG | 5.6 | 37.5 | 56 | 4 | .10 |
| | IIH | 11.2 | 82.5 | 64 | 4 | .10 |
| | III | 9.2 | 131.0 | 64 | 4 | .10 |
| | IIJ | 6.6 | 101.0 | 65 | 4 | .05 |
| Composition IV | IVA | 3.0 | 19.0 | 40 | 4 | .10 |
| | IVB | 9.8 | 48.0 | 56 | 5 | .10 |
| | IVC | 11.5 | 63 | 60 | 4 | .05 |
| | IVD | 14.6 | 78.6 | 64 | 4 | .05 |
| | IVE | 8.7 | 86 | 68 | 2 | .10 |
| | IVF | 7.0 | 80 | 72 | 3 | .10 |
| | IVG | 4.9 | 85 | 80 | 2 | .10 |
| Composition VIII | VIIIA | 2.5 | 30.0 | 30 | 4 | .10 |
| | VIIIB | 5.1 | 17.6 | 40 | 5 | .10 |
| | VIIIC | 12.6 | 13.2 | 80 | 4 | .10 |
| | VIIID | 4.1 | 17.5 | 90 | 3 | .05 |

[1] Percent salt in brine/percent salt in product.
[2] No flow.
[3] 1 drop/hour.

EXAMPLE II

In order to determine the relative effect of immersion temperatures upon the ultimate performance of the membrane, membranes prepared from Compositions II, IV and VIII as described in Example I were produced according to the conditions set forth in Table 2. The results of the comparison illustrated that Composition IV gave membranes which generally exhibited superior and more consistent performance.

EXAMPLES III THROUGH XI

In order to determine additional compositions which would produce dry membranes having the necessary properties to be useful in the applications described, several compositions were made from which membranes were ultimately produced and tested. The particulars of these compositions, their treatments and their test performances are recorded in Table 3.

TABLE 3

| Example No. and casting composition thereof (wt. percent) | Sample number | Product | | Fabrication variables | | |
|---|---|---|---|---|---|---|
| | | Flux, gal./ft.² gal. | Desalination ratio | Temp. °C. of immersion water | Immersion time, period of time membrane left in water, min. | Cast time, time from start of cast to immersion, min |
| Example III: Glyoxal (7.5); Water (17.5); Cellulose acetate (21.0); Acetone (54.0). | III(a) | 60.2 | 6.7 | 56 | 4 | .25 |
| | III(b) | 44.8 | 11.25 | 56 | 4 | .10 |
| | III(c) | 35.6 | 13.4 | 56 | 4 | .05 |
| | III(d) | 24.9 | 16.6 | 56 | 4 | .05 |
| Example IV: Dimethylformamide (75); Cellulose acetate (25) | IV(a) | 92.4 | 2.0 | 56 | 4 | .10 |
| | IV(b) | 56.0 | 2.6 | 56 | 2 | .10 |
| | IV(c) | 50.4 | 3.0 | 56 | 2 | .10 |
| Example V: Acetic acid (80); Cellulose acetate (20) | V(a) | 3.4 | 35.0 | 56 | 4 | .10 |
| | V(b) | 2.4 | 96.0 | 56 | 4 | .20 |
| Example VI: Arquad S-50 (50% soya trimethyl ammonium chloride in water) (25); Cellulose acetate (20.3); Acetone (54). | VI(a) | 21.0 | 3.5 | 64 | 4 | .10 |
| Example VII: Saturated aqueous water (24.4); Cellulose acetate (20.4); Acetone (55.2). | VII(a) | 16.2 | 3.5 | 56 | 4 | .10 |
| | VII(b) | 7.3 | 22.5 | 56 | 4 | .05 |
| Example VIII: Acetal doxime (82.7); Cellulose acetate (17.3) | VIII(a) | 1.7 | 46.3 | 64 | 4 | .50 |
| | VIII(b) | 1.4 | 45.0 | 64 | 4 | .10 |
| Example IX: Diacetone alcohol (85.8); Cellulose acetate (14.2) | IX(a) | 2.3 | 20.4 | 56 | 4 | .10 |
| | IX(b) | 2.7 | 14.8 | 64 | 8 | .10 |
| Example X: Dimethylsulfoxide (80); Cellulose acetate (20) | X(a) | 10.6 | 5.4 | 56 | 4 | .10 |
| | X(b) | 3.9 | 13.6 | 56 | 4 | .05 |
| Example XI: Arquad T-50 (50% active alkyl trimethyl ammonium chloride in water isopropenol with 1% NaCl) (25); Cellulose acetate (20.5); Acetone (54.2). | XI(a) | 12.4 | 2.2 | 64 | 4 | .10 |

It is evident from foregoing Table 3 that various compositions are capable of yielding dry membranes which perform quite effectively for the purpose for which they were intended and it is intended that the membranes produced from these compositions be part of the invention.

In reviewing the foregoing description of the invention, there are certain obvious embodiments which will be obvious to the worker in the art and it is intended that these embodiments be encompassed by the invention defined by the appended claims.

We claim:

1. A method of preparing a dry semipermeable membrane having the property of permitting substantially selective diffusion therethrough of a component of a solution and in particular the property of rejecting salt from brine under reverse osmosis conditions, said method consisting essentially of the following steps:

(a) casting a solution consisting essentially of from about 18% to 30% by weight of a cellulosic derivative of the formula:

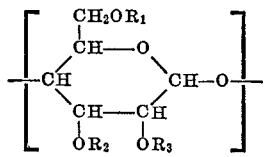

wherein $R_1$, $R_2$ and $R_3$ are hydrogen, alkyl of 1 to 8 carbon atoms or alkanoyl of 1 to 8 carbon atoms, no more than two of $R_1$, $R_2$ and $R_3$ being hydrogen, in a solvent or solvent mixture selected from the group consisting of dimethylformamide, acetic acid, acetaldoxime, diacetone alcohol, dimethyl sulfoxide, a mixture of acetone and formamide, and a mixture of acetone and glyoxal, to form a membrane;

(b) within about one minute from casting and without any previous immersion of the cast membrane in cold water, immersing said cast membrane in an aqueous medium having a temperature of at least 30° C but not more than about 80° C. for a period of time between about 1 and 30 minutes sufficient for formation of a tough outer skin on both surfaces of said membrane;

(c) removing the thus formed wet membrane from said aqueous medium; and (d) drying said wet membrane at ambient air temperature for a time sufficient to substantially completely air dry said membrane, whereby a dry semipermeable membrane capable of storage in dry state and subsequent use in reverse osmosis service is produced.

2. A method according to claim 1 wherein the solution is cast to form a membrane having a thickness of about .010 inch.

3. A method according to claim 1 wherein the time between the casting of the membrane and its immersion ranges from about .05 to about 1 minute.

4. A method according to claim 1 wherein the membrane is dried for at least 10 hours at room temperature.

5. A method according to claim 1 wherein the cellulosic solution contains as an additive a compound from the group consisting of a quaternary ammonium salt and urea.

6. The membrane obtained by the process of claim 1.

7. A method according to claim 1 wherein (a) said membrane cast possesses a thickness of approximately .010 inch;

(b) the total time of casting and immersing said membrane in said aqueous medium having a temperature of between 30° and 80° C. being from about .05 to about 1 minute;

(c) said membrane is immersed in said medium for a period ranging from 2 to 8 minutes; and (d) said membrane is dried for a period of at least 10 hours.

8. A method according to claim 7 wherein said cellulosic derivative solution is comprised of cellulose acetate dissolved in a mixture of acetone and formamide.

9. A method according to claim 8 wherein said cellulosic derivative solution is comprised by weight of 18 to 30% cellulose acetate, 33 to 52% acetone and 18 to 48% formamide.

10. A method according to claim 9 wherein said cellulosic solution is cast to form a membrane having a thickness of approximately .010 inch.

11. A method according to claim 10 wherein the total casting and immersion time ranges from about .05 to about 0.10 minute.

12. A method according to claim 7 wherein the cellulosic solution is comprised by weight of from about 23.2% cellulose acetate, about 41.8% acetone and about 35% formamide, and wherein said membrane cast from said solution is immersed in water having a temperature of about 64° for approximately 4 minutes.

References Cited

UNITED STATES PATENTS

| 3,592,672 | 7/1971 | Rowley et al. | 106—196 X |
| 3,133,132 | 5/1964 | Loeb et al. | 264—49 |
| 3,439,074 | 4/1969 | Sharples et al. | 264—41 |

FOREIGN PATENTS

| 106,462 | 5/1927 | Austria | 264—217 |
| 203,713 | 10/1924 | Great Britain | 264—218 |
| 412,798 | 7/1934 | Great Britain | 264—217 |

OTHER REFERENCES

Vos, Kenneth D., et al. "Drying Cellulose Acetate Reverse Osmosis Membranes." In I & EC "Product Research and Development," vol. 8, No. 1, March 1969, pp. 84–89.

Manjikian, S. "Improvement in Fabrication Techniques for Reverse Osmosis Desalination Membranes." International Symposium on Water Desalination. Oct. 3–9, 1965, Washington, D.C. SWD/12, pp. 1–7; 13.

PHILIP E. ANDERSON, Primary Examiner

U.S. Cl. X.R.

106—169, 186, 187, 189; 210—500; 264—41, 217